United States Patent [19]

Hoffman et al.

[11] 4,390,645

[45] Jun. 28, 1983

[54] STABLE DISPERSIONS OF POLYMERS IN POLYFUNCTIONAL COMPOUNDS HAVING A PLURALITY OF ACTIVE HYDROGENS AND POLYURETHANES THEREFROM

[75] Inventors: Dwight K. Hoffman; Robert F. Harris; Nancy B. Tefertiller, all of Midland, Mich.; Randall C. Rains, Angleton, Tex.

[73] Assignee: The Dow Chemical Company, Midland, Mich.

[21] Appl. No.: 97,070

[22] Filed: Nov. 23, 1979

[51] Int. Cl.$^3$ .................... C08G 18/14; C08G 18/63
[52] U.S. Cl. .................. 521/137; 524/762; 528/75
[58] Field of Search ............. 521/137; 528/75; 260/33.2 R; 524/762

[56] References Cited

U.S. PATENT DOCUMENTS

| | | | |
|---|---|---|---|
| 3,304,273 | 2/1967 | Stamberger | 260/2.5 |
| 3,823,201 | 7/1974 | Pizzini et al. | 260/861 |
| 3,928,299 | 12/1975 | Rosenkranz et al. | 260/89.5 N |
| 4,041,105 | 8/1977 | O'Shea et al. | 260/859 R |
| 4,049,636 | 9/1977 | Mao et al. | 260/77.5 CR |
| 4,108,954 | 8/1978 | Hilterhaus et al. | 264/216 |
| 4,111,865 | 9/1978 | Seefried et al. | 521/137 |
| 4,161,468 | 7/1979 | Davis et al. | 260/30.4 R |
| 4,166,889 | 9/1979 | Fujii et al. | 521/55 |
| 4,208,314 | 6/1980 | Priest et al. | 260/33.2 R |
| 4,226,756 | 10/1980 | Critchfield et al. | 260/33.2 R |

*Primary Examiner*—H. S. Cockeram

[57] ABSTRACT

A stable copolymer dispersion is prepared by addition copolymerization of (1) an adduct of an active hydrogen compound, e.g., a polyether polyol, and an active ethylenically unsaturated isocyanate, e. g., 2-isocyanatoethyl methacrylate with (2) ethylenically unsaturated monomers(s), e.g., styrene or mixture thereof with acrylonitrile, while (1) and (2) are dispersed or dissolved in an excess of an active hydrogen polyfunctional compound. The resulting dispersion has a controlled particle size and a viscosity such that it is suitably employed in the production of polyurethane foams.

9 Claims, No Drawings

4,390,645

STABLE DISPERSIONS OF POLYMERS IN POLYFUNCTIONAL COMPOUNDS HAVING A PLURALITY OF ACTIVE HYDROGENS AND POLYURETHANES THEREFROM

BACKGROUND OF THE INVENTION

The present invention relates to copolymer dispersions having excellent particle size distribution and to polyurethanes prepared by reacting these dispersions with reactive polyisocyanates.

Polyurethanes constitute a broad class of polymeric materials having a wide range of physical characteristics. The polymers are produced by the reaction of a polyisocyanate with a polyfunctional compound having an active hydrogen in its structure. This active hydrogen compound is generally a liquid or solid capable of being melted at relatively low temperatures. Most commonly, the active hydrogen compound contains hydroxyl groups as the moieties having the active hydrogen and thus are termed polyols, e.g., the polyols of polyesters, polyester amides, or polyethers, or mixtures of two or more such materials. For reasons of commercial availability and cost, the polyols most commonly employed in the preparation of polyurethanes are the polyethers having hydroxyl terminated chains and hydroxyl terminated polyesters.

Although a wide variety of physical and chemical properties are obtainable by the proper selection of a polyisocyanate and the polyol as well as the conditions under which the polyurethane reaction is carried out, the resulting polyurethane often exhibits properties e.g., load bearing and processability, particularly foam applications, unacceptable for some applications.

To improve such properties, it has been the practice of the art to employ graft copolymer dispersions (often called polymer polyols) prepared from vinyl monomers and polyols in the preparation of polyurethanes as shown in U.S. Pat. Nos. 3,383,351; 3,304,273; 3,523,093; 3,652,639 and 3,823,201. In 3,304,273, a mixture of styrene and a polar monomer are copolymerized while dispersed in a polyol which is essentially free of ethylenic unsaturation. Unfortunately, stable dispersions cannot be prepared by this technique if high proportions of styrene monomer are employed. Subsequently, in order to overcome this problem, it was found desirable to employ polyols which contain a significant amount of ethylenic unsaturation. As shown in U.S. Pat. No. 3,823,201, such unsaturation was advantageously introduced by reacting the polyol with an organic compound having both ethylenic unsaturation and hydroxyl, carboxyl or epoxy moieties which are reactive with the active hydrogen moiety of the polyol. While these more improved graft copolymer dispersions solve many of the problems confronting the polyurethane art, more efficient control of particle size of the disperse phase is desired for many applications.

Accordingly, it is highly desirable to provide an improved copolymer dispersion wherein less unsaturated moiety is required in the polyahl in order to achieve the desired particle size and particle size distribution in the dispersion.

SUMMARY OF THE INVENTION

In one aspect, the present invention is such an improved copolymer dispersion which comprises:
(A) a polyahl having dispersed therein;
(B) an addition copolymerizate of (1) an adduct of a polyahl and an active ethylenically unsaturated isocyanate (hereinafter called "isocyanate monomer") with (2) at least one other ethylenically unsaturated monomer (hereinafter called "other ethylenically unsaturated monomer"); or
(C) an adduct of (1) an addition copolymer of an isocyanate monomer with at least one other ethylenically unsaturated monomer which is nonreactive with the isocyanate and the polyahl and (2) a polyahl; or
(D) a mixture of (B) and (C); or
(E) a mixture of (B) and/or (C) and a polymer of at least one other ethylenically unsaturated monomer.

For the purposes of this invention, a "polyahl" is a polyfunctional compound wherein at least two of the functional groups are active hydrogen moieties capable of reacting with an isocyanate moiety to form a urethane or similar moiety. In addition, the terms "dispersed" or "dispersion" as used herein are generic to include dispersions wherein the disperse phase constitutes colloidal size particles as well as true solutions wherein the disperse phase is at the molecular or ionic level.

Surprisingly, the copolymer dispersions of the present invention exhibit excellent stability even when relatively low concentrations of ethylenically unsaturated moieties exist in the adduct of the polyahl. Even more surprising is the excellent control over particle size and particle size distribution achieved in said dispersions.

This invention, is another aspect, is a method for making the aforementioned copolymer dispersion. In yet another aspect, this invention is a polyurethane composition, preferably in the form of a foam, prepared from the copolymer dispersion as well as a method for reacting the copolymer dispersion with polyisocyanate to form polyurethane foams and other polyurethane compositions.

The copolymer dispersions of the present invention are usefully employed in the production of a wide variety of polyurethane products including cellular polyurethanes, polyurethane films and coatings as well as cast or molded articles of such polyurethanes. As used herein, the term "polyurethane" is to be broadly construed to include the polymeric reaction products of isocyanates with polyahls as hereinbefore defined.

DETAILED DESCRIPTION OF REPRESENTATIVE EMBODIMENTS

The polyahl suitably employed in the practice of this invention includes any polyfunctional compound having at least two active hydrogen moieties. For the purposes of this invention, an active hydrogen moiety refers to a moiety containing a hydrogen atom which, because of its position in the molecule, displays significant activity according to the Zerewitnoff test described by Woller in the *Journal of American Chemical Society*, Vol. 49, page 3181 (1927). Illustrative of such active hydrogen moieties are —COOH, —OH, —NH$_2$, —NH—, —CONH$_2$, —SH and —CONH—. Typical polyahls include polyols, polyamines, polyamides, polymercaptans and polyacids.

Of the foregoing polyahls, the polyols are preferred. Examples of such polyols are the polyol polyethers, the polyol polyesters, hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers including polythioethers, acetals including polyacetals, aliphatic and aromatic polyols and thiols including polythiols, ammonia and amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and a hydroxyl group. Also alkylene adducts of compounds which contain one —SH group and one —OH group as well as those which contain an amino group and a —SH group may be used.

Polyether polyols which are most advantageously employed as the polyahl in the practice of this invention are the polyalkylene polyether polyols including the polymerization products of alkylene oxides and other oxiranes with water or polyhydric alcohols having from two to eight hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, α-methyl glucoside, pentaerythritol, erythritol, pentatols and hexatols. Also included within the term "polyhydric alcohol" are sugars such as glucose, sucrose, fructose and maltose as well as compounds derived from phenols such as 2,2-(4,4'-hydroxyphenyl)propane, commonly known as bisphenol A. Illustrative oxiranes that are advantageously employed in the preparation of the polyether polyol include simple alkylene oxides such as ethylene oxide, propylene oxide, butylene oxide, and amylene oxide; glycidyl ethers such as t-butyl glycidyl ether and phenyl glycidyl ether; and random or block copolymers of two or more of these oxiranes. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have primary, secondary or tertiary hydroxyl groups and, preferably, are polyethers prepared from alkylene oxides having from two to six carbon atoms such as ethylene oxide, propylene oxide and butylene oxide. The polyalkylene polyether polyols may be prepared by any known process such as, for example, the process disclosed by Wurtz in 1859 and *Encyclopedia of Chemical Technology*, Vol. 7, pp. 257-262, published by Interscience Publishers, Inc. (1951), or in U.S. Pat. No. 1,922,459. Also suitable are polyether polyols and processes for preparing them that are described in Schick, M. J., *Nonionic Surfactants*, Marcel Dekker, Inc., New York (1967), U.S. Pat. Nos. 2,891,073; 3,058,921; 2,871,219 and British Pat. No. 898,306. Polyether polyols which are most preferred include the alkylene oxide addition products of water, trimethylolpropane, glycerine, pentaerythritol, sucrose, sorbitol, propylene glycol and blends thereof having hydroxyl equivalent weights of from about 250 to about 5000.

Polyhydric thioethers which are sometimes advantageously condensed with alkylene oxides include the reaction product of thiodiglycol with alkylene oxides or dihydric alcohols such as disclosed above.

Polyhydroxyl-containing phosphorus compounds which are optionally used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72% to about 95%.

Polyacetals (acetal resins) which are optionally reacted with alkylene oxides or other oxiranes include the reaction product of formaldehyde or other suitable aldehyde with a polyhydric alcohol or an oxirane such as those disclosed above. Polyacetals derived from acetone or from cyclic acetals are also suitably employed.

Aliphatic and aromatic thiols which are optionally reacted with alkylene oxides and other oxiranes include alkane thiols such as 1,2-ethane dithiol, 1,2-propane dithiol and 1,6-hexane dithiol; alkene thiols such as 2-butene-1,4-dithiol; and alkyne thiols such as 3-hexyne-1,6-dithiol; and arene thiols such as 1,4-benzene dithiol. Other thiols suitable for this purpose are hydrogen sulfide as well as thio functional polymers such as polyvinylbenzyl thiol.

Acids and amides which are optionally reacted with alkylene oxides and other oxiranes include difunctional fatty acids such as hydroxystearic and dihydroxystearic acid as well as amides such as fatty acid alkanol amides, e.g., lauroyl monoethanolamide; diacids such as adipic and terephthalic acid; sulfonamides and other acids and amides set forth in Schick, supra.

Amines which are optionally reacted with alkylene oxides and other oxiranes include aromatic amines such as aniline, o-chloroaniline, p-amino aniline, 1,5-diamino naphthalene, methylene dianiline, the condensation products of aniline and formaldehyde and 2,4-diamino toluene; aliphatic amines such as methylamine, triisopropanolamine, isopropanolamine, diisopropanolamine, ethylenediamine, 1,3-propylenediamine, 1,4-butylenediamine and 1,3-butylenediamine, mixtures thereof and the like.

Additional polyethers and methods for their preparation are set forth in Schick, supra.

Examples of suitable hydroxy-containing polyesters include those obtained from polycarboxylic acids and polyhydric alcohols. Examples of suitable polycarboxylic acids include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol and sorbitol. Also included with the term "polyhydric alcohol" are compounds derived from phenols such as 2,2(4,4'-hydroxyphenyl)propane, commonly known as bisphenol A, bis(4,4'-hydroxyphenyl)sulfide and bis(4,4'-hydroxyphenyl)sulfone.

Other polyahls suitably employed include polylactones; hydroxy functional acrylic polymers such as polymers of hydroxyethyl acrylate and hydroxypropyl acrylate; polyvinyl acetate and other polymers of vinyl acetate and other ethylenically unsaturated carboxylic acids; hydroxyl-containing epoxy resins; urea-formaldehyde and melamine-formaldehyde resins; hydroxyl-containing polycarbonates and polyurethanes; methylol resins; starches and other cellulosic polymers; esters of phosphoric, sulfonic, sulfuric and boric acid; and polypeptides.

The adduct of polyahl and isocyanate monomer is the reaction product resulting from the reaction of an active hydrogen moiety of a polyahl with the isocyanate moiety of an active ethylenically unsaturated isocyanate. The adduct is advantageously compatible with the polyahl which is the continuous phase of the copolymer dispersion. By "compatible with" it is meant that the adduct is either soluble in or dispersible in the polyahl. Typically, the adduct has a polymer backbone corresponding to the polymer backbone of the polyahl and at least one pendant ethylenically unsaturated urethane group. When the polyahl is a polyol, the linkage is a urethane linkage represented by the formula:

When the polyahl is polyamine, the linkage is a urea linkage represented by the formula:

The more preferred adducts employed in the present invention are those represented by the formula:

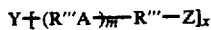

wherein each A is individually —O—, —S— or

wherein $R_1$ is hydrogen or alkyl, preferably A is —O—; Y is hydroxyl, oxyhydrocarbyl, oxycarbonylhydrocarbyl, an oxycarbonylamino aliphatic hydrocarbyl ester of an $\alpha,\beta$-ethylenically unsaturated carboxylic acid or a residue of an active hydrogen initiator suitably employed in preparation of a polyether; each Z is individually hydroxyl, oxyhydrocarbyl, oxycarbonylhydrocarbyl or said oxycarbonylamino aliphatic hydrocarbyl ester group provided that the polyether contains at least one of said oxycarbonylamino ester groups, each R''' is individually alkylene, hydroxylalkylene, aminoalkylene, alkoxyalkylene, aryloxyalkylene, arylalkylene, hydroxyalkylalkylene, hydroxyarylalkylene, or haloalkylene; m is a whole number such that —R'''A)$_m$-R'''- has a number average molecular weight ($M_n$) from about 100 to about 100,000, especially from about 250 to about 10,000; and x is a whole number from 1 to 10 provided that when Y is other than hydroxyl, x is at least 2. Most preferably, x is 2 or 3. For the purposes of this invention, hydrocarbyl is a monovalent hydrocarbon moiety such as aryl, alkyl, alkenyl and the like. Also, the terminology "each R''' is individually" means that the R''' groups in a particular polymer molecule may be the same or different. A corresponding interpretation applies to the terminologies "each Z is individually" and "each A is individually."

The most preferred adducts have polyalkyleneoxy backbones bearing at least one pendant ethylenically unsaturated urethane group represented by the formula:

wherein each R is individually hydrogen, alkyl or a comparable inert substituent; M is an ethylenically unsaturated moiety such as

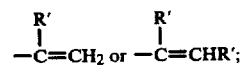

each R' is individually hydrogen, lower alkyl ($C_1$-$C_4$) or

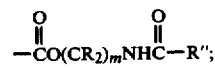

with R'' being an inert group such as alkoxy or polyalkyleneoxy; and m is a whole number preferably 1 to 6, more preferably 2 to 4, and most preferably 2.

The adduct of isocyanate monomer and polyahl (hereinafter called "mono-adduct") is most advantageously prepared by reacting an active ethylenically unsaturated isocyanate with a polyahl under conditions sufficient to cause the isocyanato group of the isocyanate monomer to react with an active hydrogen group of the polyahl to form a urethane-type linkage. Advantageously, when the polyahl is a polyol, the reaction is carried out in the presence of a urethane catalyst such as amine or an organometallic catalyst, preferably an organometallic catalyst such as stannous octoate, lead octoate, stannous acetate, dibutyltin dilaurate and tin and zinc thiolates. The conditions employed in carrying out the urethane reaction involve maintaining the reaction mixture of the polyahl and isocyanate monomer, preferably neat, or alternatively dissolved in a non-reactive solvent such as ethyl acetate, toluene or cellosolve acetate at a temperature from ambient to 140° C. in a vessel for a reaction time from a few seconds to about 24 hours. Also suitably employed are reactive solvents such as polyahl or other ethylenically unsaturated monomers. The equivalent ratio of isocyanate monomer to active hydrogen of the polyahl is less than one. In the more preferred embodiments, very low NCO:active equivalent hydrogen ratios are employed, e.g., less than 0.2:1, most preferably 0.1:1 to 0.001:1. The resulting mono-adduct having pendant ethylenically unsaturated urethane group(s) is generally used without further purification. If a solvent has been used in the reaction, it can be removed, or the composition containing the solvent can be employed as is. Also, the mono-adduct can be blended with additional polyahl.

The adduct of (1) addition copolymer of isocyanate monomer with at least one other ethylenically unsaturated monomer and (2) a polyahl (hereinafter called "poly-adduct") is beneficially prepared by first copolymerizing the isocyanate monomer with other monomer(s) by polymerization techniques described hereinafter and then reacting the copolymer with polyahl using the procedures and conditions described hereinbefore to react the isocyanate monomer with the polyahl.

The mixture of poly-adduct and copolymerizate of mono-adduct and other monomer(s) is readily prepared by physically mixing the components neat or dispersed in polyahl. Alternatively, this mixture can be prepared by subjecting a mixture of polyahl, isocyanate monomer and other monomer(s) to conditions sufficient to cause copolymerization and isocyanate/polyahl reaction. The polyahl dispersion containing a mixture of the poly-adduct and/or the copolymerizate with a polymer(s) of other monomer(s) is advantageously made by forming a dispersion of poly-adduct and/or copolymerizate in polyahl by one of the foregoing methods and then adding other monomer(s) and subjecting the resulting formulation to polymerization conditions. It is found that the poly-adduct and/or copolymerize stabilize the resulting dispersion of polymer much in the same manner as described in U.S. Pat. No. 4,148,840.

For the purposes of this invention, the term "active ethylenically unsaturated isocyanate" or "isocyanate monomer" means a monomer having an isocyanate group and an ethylenically unsaturated group capable of undergoing free radical initiated addition polymerization as readily as an $\alpha,\beta$-ethylenically unsaturated isocyanate, preferably as readily as acryloyl. Representative isocyanates are the isocyanatoalkyl esters of $\alpha,\beta$-ethylenically unsaturated carboxylic acids, $\alpha,\beta$-ethylenically unsaturated isocyanate, monovinylidene aryl isocyanates and monovinylidene arylmethyl isocyanates, with the isocyanatoalkyl esters being preferred.

Exemplary isocyanatoalkyl esters include 2-isocyanatoethyl methacrylate, 2-isocyanoethyl acrylate, 3-isocyanatopropyl methacrylate, 1-methyl-2-isocyanatoethyl methacrylate and 1,1-dimethyl-2-isocyanatoethyl acrylate with 2-isocyanatoethyl methacrylate being most preferred. Suitable methods of preparing said isocyanato esters are well known, e.g., as shown in U.S. Pat. Nos. 2,718,516 and 2,821,544 and British Pat. No. 1,252,099. Exemplary monovinylidene aromatic isocyanates and monovinylidene arylmethyl isocyanates include styrene isocyanate and vinylbenzyl isocyanate. Exemplary $\alpha,\beta$-ethylenically unsaturated isocyanates include vinyl isocyanate and isopropenyl isocyanate.

Suitable ethylenically unsaturated monomers (so-called other monomers or other ethylenically unsaturated monomers) which are copolymerized to form copolymers with the aforementioned adducts include aliphatic conjugated dienes such as butadiene and isoprene; monovinylidene aromatic monomers such as styrene, $\alpha$-methyl styrene, ar-methyl styrene, ar-(t-butyl)styrene, ar-chlorostyrene, ar-cyanostyrene and ar-bromostyrene; $\alpha,\beta$-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; $\alpha,\beta$-ethylenically unsaturated nitriles and amides such as acrylonitrile, methacrylonitrile, acrylamide, methacrylamide, N,N-dimethyl acrylamide, N-(dimethylaminomethyl)acrylamide, and the like; vinyl esters such as vinyl acetate; vinyl ethers; vinyl ketones; vinyl and vinylidene halides as well as a wide variety of other ethylenically unsaturated materials which are copolymerizable with the aforementioned adduct, many of which have heretofore been employed in the formation of copolymer polyols as described in U.S. Pat. Nos. 3,823,201 and 3,383,351. It is understood that mixtures of two or more of the aforementioned monomers are also suitably employed in making the copolymer. Of the foregoing monomers, the monovinylidene aromatic monomers, particularly styrene, and the ethylenically unsaturated nitriles, particularly acrylonitrile, are especially preferred.

The amount of other ethylenically unsaturated monomer(s) employed in the copolymerization reaction is generally an amount sufficient to provide good reinforcement in urethane polymers and cell opening in urethane foams. Preferably, the amount of other unsaturated monomer(s) is from about 1 to about 70, more preferably from about 5 to about 50, most preferably from about 10 to about 40, weight percent based on the weight of the copolymer dispersion. The amount of the mono-adduct employed in the copolymerization reaction is an amount sufficient to produce a stable dispersion and provide particle size control. Preferably, the amount of the adduct employed is in the range from about 0.0002 to about 30, more preferably from about 0.005 to about 10, most preferably from about 0.02 to about 5, weight percent based on the weight of the copolymer dispersion.

The copolymerization is readily carried out by simultaneously adding at a steady or constant rate a monomer(s) and a free radical catalyst to a mixture of the mono-adduct and the polyahl under conditions sufficient to cause free radical addition polymerization. The temperature of the copolymerization is dependent upon the initiator and is preferably in the range from about 25° to about 190° C., most preferably from about 110° to about 130° C., when azo-type catalysts are used. Alternatively, the free radical catalyst may be dispersed in a portion of the polyahl and thereafter added along with monomer to the remaining portion of the polyahl containing the mono-adduct. Other polymerization processes, both continuous and batch, may be suitably employed.

Suitably, the concentration of polymerization catalyst is any amount sufficient to cause copolymerization of the mono-adduct and the ethylenically unsaturated monomer(s). Preferably, however, the concentration of catalyst is in the range from about 0.1 to about 20, more preferably from about 0.5 to about 5, weight percent based on the combined weight of the mono-adduct and other monomer(s).

Catalysts suitably employed in the practice of the copolymerization are free radical type polymerization catalysts such as the peroxides, persulfates, perborates, percarbonates, azo compounds and the like. Examples of such catalysts include hydrogen peroxide, di(t-butyl)-peroxide, t-butyl peroctoate, lauroyl peroxide, cumene hydroperoxide, t-butyl hydroperoxide, azobis-(isobutyronitrile) as well as mixtures of such catalysts. Of the foregoing catalysts, azobis(isobutyronitrile) is preferred.

In addition to the foregoing catalysts, chain transfer agents such as mercaptans, e.g., dodecanethiol, and carbon tetrahalides such as carbon tetrachloride may be employed in conventional amounts to control molecular weight of the copolymerizate.

The resulting copolymer dispersion is readily reacted with an organic polyisocyanate to form desired polyurethane products using conventional polyurethane reaction conditions and procedures. Such reaction and procedures are optionally carried out in the presence of additional polyahls, chain extending agents, catalysts, surface active agents, stabilizers, blowing agents, fillers and pigments. In the preparation of foamed polyurethane, suitable procedures for the preparation of same are disclosed in U.S. Pat. No. RE 24,514, which is incorporated herein by reference. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the graft copolymer dispersion of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene choride and methylene chloride may be used as blowing agents.

The foams may also be prepared by the froth technique as described in U.S. Pat. Nos. 3,755,212; 3,849,156 and 3,821,130 which are also incorporated herein by reference.

Organic polyisocyanates which may be employed include aromatic, aliphatic and cycloaliphatic polyisocyanates and combinations thereof. Representative of these types are the diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4'-triphenylmethane triisocyanate, polymethylene polyphenylisocyanate and tolylene-2,4,6-triisocyanate; and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the practice of the present invention, such as crude toluene diisocyanate obtained by the phosgenation of a mixture of toluene diamines or crude diphenylmethylene diisocyanate obtained by the phosgenation of crude diphenylmethylenediamine. The preferred undistilled or crude isocyanates are disclosed in U.S. Pat. No. 3,215,652.

The copolymer dispersions of this invention are preferably employed in combination with other polyahl(s) commonly employed in the art. Accordingly, any of the polyahls which are described above for use in the preparation of the polymer dispersions of the present invention may be employed.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols or mixtures thereof. A preferred group of chain-extending agents includes water and primary and secondary aromatic diamines which react more readily with the isocyanate than does water such as phenylenediamine, bis(3-chloro-4-aminophenyl)methane, 2,4-diamino-3,5-diethyl toluene, trisecondary butanolamine, isopropanolamine, diisopropanolamine, N-(2-hydroxypropyl)ethylenediamine, and N,N'-di(2-hydroxypropyl)ethylenediamine.

The urethane reaction of polyisocyanate with the copolymer dispersion is advantageously carried out in the presence of an amount of urethane-type catalyst which is effective to catalyze reaction of the polyahl of the copolymer dispersion with the polyisocyanate. Preferably, the amount of urethane catalyst is an amount comparable to that used in conventional urethanetype reactions.

Any suitable urethane catalyst may be used including tertiary amines, such as for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropyl amine, N,N-dimethyl-N',N'-methyl isopropyl propylenediamine, N,N-diethyl-3-diethylaminopropyl amine, dimethyl benzyl amine and the like. Other suitable catalysts are, for example, tin compounds such as stannous chloride, tin salts of carboxylic acids such as dibutyltin di-2-ethyl hexoate, as well as other organometallic compounds such as are disclosed in U.S. Pat. No. 2,846,408.

A wetting agent(s) or surface-active agent(s) is generally necessary for production of high grade polyurethane foam according to the present invention, since in the absence of same, the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters and alkyl arylsulfonic acids.

The following examples are given to illustrate the present invention and are not to be construed as limiting the scope thereof in any manner. All parts and percentages are by weight unless otherwise indicated.

EXAMPLE 1

Into a liter, 3-necked round bottomed flask equipped with addition funnel, stirrer, condenser, thermocouple and nitrogen sparge is charged 400 g (0.0825 mole) of a glycerine initiated polyalkylene polyol made from propylene oxide and ethylene oxide and having a hydroxyl number of 34.7 (Polyol I). Polyol I is heated to 50° C. and 1.102 g (0.0072 mole) of 2-isocyanatoethyl methacrylate (IEM) and 50 g of methylene chloride is added to the Polyol I with stirring. The mixture is then heated to 120° C. to form an adduct of IEM and polyether polyol which is dissolved in the polyether polyol. At this time, a 100-g portion of styrene containing 0.7 g of azobis(isobutyronitrile) (AZO) is added to the IEM Polyol I mixture over a 30-minute period. The reaction mixture is stirred at 120° C. for an additional 2 hours and then subjected to vacuum for 45 minutes to remove volatiles. The final product is a stable copolymer dispersion having a Brookfield viscosity (Model RV, spindle #4 at rpm of 50 and temperature of 18° C.) of 2,912 cps.

For purposes of comparison, the foregoing procedure is followed except that no IEM is added at any point during the process. Upon subjecting the reaction mixture containing no IEM to polymerization conditions, a very poor dispersion is formed containing relatively large chunks (>1 mm) of polystyrene. During the later stages of the reaction, the reaction mixture becomes so viscous that the stirrer can no longer operate. The resulting reaction mass exhibits poor fluidity and cannot be classified as a stable dispersion.

EXAMPLE 2

A 396-g (0.0816 mole) portion of Polyol I is charged into a liter, 3-necked round bottomed reaction vessel equipped with a thermocouple, funnel, stirrer, condenser, a thermonipple and nitrogen sparge. The polyether polyol is heated to 50° C. and 1.25 g (0.008 mole) of IEM and 50 ml of methylene chloride and 5 g of a one percent solution of dibutyltin dilaurate (DBTDL) in Polyol I is added to the reaction vessel with stirring. The mixture is heated to 120° C. and maintained at that temperature for one hour, at which time IR analysis shows that the isocyanate has completely reacted. A solution of 0.7 g of AZO in 100 g of styrene is added to the reaction vessel over a 25-minute period. After an additional 20 minutes, an additional 0.7 g of AZO and 15 ml of methylene chloride is added to the reaction vessel over a 20-minute period. The reaction mixture is maintained at 120° C. for an additional 55 minutes before removing volatiles from the product under vacuum for 40 minutes. The resulting stable milky copolymer dispersion has a Brookfield viscosity (Model RV, spindle #4, rpm 5 at 18° C.) of 24,690 cps.

EXAMPLE 3

A 396-g (0.0784 mole) portion of a glycerine initiated polyalkylene polyol (hydroxyl number of 33.3) made from propylene oxide and ethylene oxide is charged to a reaction vessel as employed in Example 2. The polyether polyol is heated to 50° C. and 0.2475 g (0.0016 mole) of IEM and 4 g of 0.1 percent solution of DBTDL in the polyether polyol is added to the reaction vessel with stirring. The resulting mixture is heated to 120° C. and maintained at that temperature for 15 minutes to form the desired IEM polyether polyol adduct (mono-adduct). A solution of 2 g of AZO in 100 g of styrene is then added with stirring to the reaction vessel over a 2-hour period. The resulting mixture is maintained at 120° C. for an additional hour and then subjected to vacuum to remove unreacted styrene and other volatiles for two hours. The final product is a stable milky dispersion which is tested for viscosity and particle size with the results being reported in Table I.

Following the procedure of this Example, additional copolymer dispersions are formed in which the molar ratio of IEM to polyether polyol is varied as specified in Table I. The stable milky dispersions resulting from these runs are tested for viscosity and the results are reported in Table I.

TABLE I

| Sample No. | Mole Ratio IEM/Polyol I | Viscosity (1), cps | Particle Size (2), μm |
|---|---|---|---|
| 1 | 0.020 | 1,640 (21–22° C.) | 6.3 |
| 2 | 0.041 | 2,510 (21–22° C.) | 4.6 |
| 3 | 0.062 | 2,917 (21–22° C.) | 3.4 |
| 4 | 0.081 | 3,018 (21–22° C.) | 2.9 |
| 5 | 0.102 | 2,833 (21–22° C.) | 1.7 |
| 6 | 0.164 | 5,100 (21–22° C.) | 1.1 |
| 7 | 0.326 | 29,250 (21–22° C.) | 0.6 |

(1) Brookfield viscosity (Model RV, spindle #3, 20 rpm).
(2) Particle size determined using a transmission electron microscope wherein the copolymer dispersion is diluted with methanol and dried onto a carbon substrate. Excess polyether polyol is removed from copolymer particles by soaking them in methanol.

As evidenced by the data set forth in Table I, the viscosity of the graft copolymer dispersion increases noticeably as the molar ratio of IEM to polyether polyol is increased.

EXAMPLE 4

A 1088-g (0.158 mole) portion of a glycerine-initiated polyalkylene polyol (hydroxyl number of 24.4) made from propylene oxide and ethylene oxide is charged to a 2-liter, 3-necked round bottomed reaction vessel equipped with thermonipple, addition funnel, stirrer, condenser, thermocouple and nitrogen sparge. The polyether polyol is heated to 50° C. and 2.698 g (0.174 mole) of IEM and 12 g of a 0.1 percent solution of DBTDL in the polyether polyol are added to the reaction vessel with stirring. The reaction mixture containing the monoadduct is heated to 120° C. and 300 g of styrene containing 6.0 g of dissolved AZO is added over a two-hour period. An additional 1 g of AZO in 100 g of polyol is added over a 40-minute period. The reaction mixture is stirred at 120° C. for an additional 1 hour and then subjected to vacuum to remove volatiles. The resulting stable milky copolymer dispersion has a Brookfield viscosity (Model RV, spindle #3 at rpm of 20 and temperature of 25° C.) of 4,590 cps.

EXAMPLE 5

Using the reaction vessel of Example 4, a 1088-g (0.374 mole) portion of a glycerine-initiated polyalkylene polyol (hydroxyl number of 57.8) is charged into the vessel and heated to 50° C. A 6.498-g (0.0419 mole) portion of IEM and 12 g of a 0.1 percent solution of DBTDL in the polyether polyol are added to the reaction vessel with stirring thereby forming the monoadduct. The mono-adduct is copolymerized with styrene as in Example 4. The resulting product of the devolatilization is a stable milky dispersion having a Brookfield viscosity (Model RV, spindle #3 at 20 rpm and 25° C.) of 1,725 cps.

EXAMPLE 6

Into a 2-liter flask equipped as in Example 1 is charged 1188 g (0.239 mole) of Polyol I. Polyglycol I is heated to 50° C. and 12 g of 0.1 percent solution of DBTDL in the polyol is charged to the vessel with stirring. A 7.52-g (0.0485 mole) portion of IEM is added to the vessel. The reaction mixture is maintained at 50° C. for 2 hours at which time IR spectroscopy indicates complete reaction of isocyanate to form the monoadduct.

A 132-g portion of this mono-adduct is combined with 528 g (0.11 mole) of the polyol in a 2-liter reaction vessel as used in Example 4. The reaction vessel is heated to 115° C. and a solution of 6.2 g of AZO, 83 g of the mono-adduct, 255 g (0.05 mole) of Polyglycol I and 250 g of styrene is added to the reaction vessel while stirring over a 2-hour period. The reaction is allowed to continue for an additional hour and then devolatilized for an additional hour. The resulting copolymer dispersion has a Brookfield viscosity (Model RV, spindle #3 at 20 rpm and 25° C.) of 1800 cps.

EXAMPLE 7

Using the reaction vessel of Example 1, 389 g (0.078 mole) of Polyol I is charged to the vessel and heated to 55° C. A 1.28-g portion (0.008 mole) of IEM in 50 g of $CH_2Cl_2$ is charged to the vessel through an addition funnel having its delivery tube proximate to the surface of the contents of the vessel, and the vessel is heated to 121° C. After an hour at this temperature, a solution of 0.7 g of AZO, 50 g of styrene and 49 g of acrylonitrile is added to the vessel over a 55-minute period during which time the temperature of the vessel increased to 125° C. Thereafter, a 0.7-g portion of AZO in 15 g of $CH_2Cl_2$ is added, and the reaction is continued at 120° C. for 65 minutes. The reaction mixture is devolatilized to form a milky dispersion having a Brookfield viscosity (Model RV, spindle #3 at 10 rpm and 21° C.) of 3,726 cps.

EXAMPLE 8

Using the reaction vessel of Example 1, 396.5 g (0.08 mole) of Polyol I is charged to the vessel and then heated to 50° C. A 0.5-g (0.0032 mole) portion of IEM and 4 g of a 1 percent solution of DBTDL in Polyol I are added to the reaction vessel. The resulting mixture is heated to, and maintained at, 120° C. for 1 hour. Thereafter, a solution of 0.5 g of AZO, 25 g of styrene and 75 g of acrylonitrile is added to the reaction vessel over a 2-hour period. The reaction vessel is maintained at 120° C. for an additional 2 hours and devolatilized for 50 minutes. The resulting yellow, slightly milky dispersion has a Brookfield viscosity (Model RV, spindle #3 at 10 rpm and 20.5° C.) of 2,247 cps.

Following the foregoing procedure, except that the proportions of IEM, AZO, styrene and acrylonitrile are varied, several additional dispersions are prepared and tested for viscosity. The results are reported in Table II.

TABLE II

| Sample No. | IEM/Polyol I (1) | Styrene, Wt % (2) | AZO, Wt % (3) | Viscosity, cps (4) |
|---|---|---|---|---|
| 1 | 0.04 | 25 | 0.5 | 2247 |
| 2 | 0.04 | 25 | 1.5 | 2928 |
| 3 | 0.12 | 25 | 1.5 | 4401 |
| 4 | 0.04 | 75 | 0.75 | 5786 |
| 5 | 0.12 | 75 | 0.5 | 3818 |
| 6 | 0.12 | 75 | 1.5 | 4040 |
| 7 | 0.04 | 50 | 0.5 | 2905 |
| 8 | 0.08 | 50 | 1.0 | 4537 |
| 9 | 0.12 | 50 | 0.5 | 4328 |
| 10 | 0.02 | 50 | 2.0 | 2884 |

(1) Mole ratio of isocyanatoethyl methacrylate
(2) Weight of styrene based on combined weight of styrene and acrylonitrile
(3) Weight percent of AZO based on combined weight of styrene and acrylonitrile
(4) Brookfield viscosity (Model RV, spindle #3, 10 rpm and 20.5° C.)

EXAMPLE 9

Using the reaction vessel of Example 1, 396.5 g (0.08 mole) of Polyol I and 4 g of 1 percent solution of DBTDL in the polyether polyol are charged into the vessel and heated to 120° C. A mixture of 50 g of styrene, 50 g of acrylonitrile, 0.516 g (0.0033 mole) of IEM and 0.5 g of AZO are added to the reaction vessel over a 2-hour period. The reaction mixture was maintained at 120° C. for an additional 2 hours and then devolatilized for 2 hours. The resulting stable dispersion has a Brookfield viscosity (Model RV, spindle #3 at 10 rpm and 22.5° C.) of 3,856 cps.

EXAMPLE 10

Using the reaction vessel of Example 4, 1138.9 g (0.23 mole) of Polyol I and 12 g of 1 percent solution of DBTDL in Polyol I are charged to the reaction vessel and heated to 120° C. A mixture of 150 g of acrylonitrile, 150 g of styrene, 50.5 g of the mono-adduct of IEM Polyol I (Example 1) (1:1 mole ratio) and 1.5 g of AZO is charged into the reaction vessel over a 2-hour period with mixing. The reaction mixture is maintained at 120° C. for an additional 1½ hours and then devolatilized. The resulting copolymer dispersion has a Brookfield viscosity (Model RV, spindle #3 at 10 rpm and 19.5° C.) of 3,878 cps.

EXAMPLE 11

Using the reaction vessel in Example 4, 929 g (0.19 mole) of Polyol I and 325.2 g of a 20 percent copolymer dispersion (75/25 styrene/acrylonitrile copolymer in IEM capped Polyol I) is prepared by the procedure of Example 8. The reaction vessel is heated to 120° C. and a solution of 4.6 g of AZO, 116.2 g of acrylonitrile and 116.2 g of styrene is added to the reaction vessel over a 2-hour period with stirring. The reaction vessel is maintained for 2 hours. The resulting dispersion has a Brookfield viscosity (Model RV, spindle #3, 10 rpm and 21° C.) of 3,942 cps.

EXAMPLE 12

Using the reaction vessel used in Example 4, 1188 g (0.24 mole) of Polyol I, 1.497 g (0.0096 mole) of IEM and 12 g of 0.1 percent solution of DBTDL in Polyglycol I are charged to the reaction vessel and heated to 70° C. for 1 hour with stirring. The vessel is then charged with a solution of 4.5 g of AZO in 150 g of acrylonitrile over a 40-minute period. The reaction temperature is maintained at 70° C. for 3½ hours and then devolatilized for 2 hours. The resulting copolymer dispersion has a Brookfield viscosity (Model RV, spindle #3, 1 rpm and 22° C.) of 53,940 cps. Similar copolymer dispersions having lower viscosities are readily prepared by the foregoing procedure except that increased AZO concentrations are employed.

EXAMPLE 13

Using the reaction vessel and procedure employed in Example 7, a copolymer dispersion is prepared employing t-butyl peroctoate (0.5% based on monomers) instead of AZO as the initiator. The amount of IEM employed is 0.04 mole per mole of polyol, and the weight ratio of styrene to acrylonitrile is 1:1. The resulting dispersion has a Brookfield viscosity (Model RV, spindle #3, 10 rpm and 20.5° C.) of 4,448 cps.

EXAMPLE 14

Using the reaction vessel of Example 9, 882 g (0.18 mole) of Polyol I is charged to the reaction vessel and heated to 50° C. A 0.4657 g (0.003 mole) portion of IEM and 9 g of 0.1 percent solution of DBTDL in Polyol I are charged with stirring to the reaction vessel which is heated to 120° C. for 1 hour. The vessel is then charged with a solution of 300 g of styrene, 300 g of acrylonitrile and 12 g of AZO over a 2-hour period while stirring the contents of the vessel. The reaction vessel is maintained at 120° C. for an additional hour and then devolatilized for 2 hours. The resulting copolymer dispersion contains 40% polymer solids and has a Brookfield viscosity (Model RV, spindle #5, 10 rpm and 23.5° C.) of 19,733 cps. This dispersion is readily diluted to lower solids by adding Polyol I.

EXAMPLE 15

Using the copolymer dispersion of Example 8, a polyurethane foam is prepared according to the following procedure. A urethane foam formulation is prepared which consists of 63.3 parts of Polyol I, 36.7 parts of the copolymer dispersion (20% solids), 3.3 parts of water, 0.7 part of a nonhydrolyzable organosilicon surfactant sold by Union Carbide under the designation L5303, 0.04 part of poly(dimethyl silicone) surfactant sold by Dow Corning under the designation DCF-1-1630, 0.185 part of triethylenediamine, 0.10 part of a 70% solution of bis(N,N-dimethylaminoethyl)ether in dipropylene glycol, 0.15 part of N,N-dimethylethanolamine, 0.005 part of alkylthiotin delayed action urethane catalyst sold by Argus Chemical under the designation UL-1 and 39.4 parts of a mixture of 80% of toluene diisocyanate (80/20 mixture of 2,4-isomer and 2,6-isomer) and 20% of polymethylene polyphenyl isocyanate sold by Mobay Chemical under the tradename Mondur MRS.

The foregoing ingredients, except the isocyanate, are placed in a metal cup and vigorously mixed (1800 rpm) for 25 seconds. The isocyanate is then added with further mixing (2000 rpm) for 2 seconds. The foaming mixture is then poured into a waxed aluminum mold (38.1 cm × 38.1 cm × 11.4 cm) which has been preheated to ~135° F. The mold containing the foam is then placed in an oven preheated to 250° F. for 4.5 minutes. The foam is removed from the mold, crushed and conditioned for one week at constant temperature and humidity.

The resulting polyurethane foam exhibits physical properties comparable to conventional polyurethane foams made using conventional polymer polyols, e.g., those described in U.S. Pat. No. 3,823,201.

What is claimed is:

1. A copolymer dispersion which is stable and which comprises:
   (A) a polyahl having dispersed therein;
   (B) an addition copolymerizate of (1) an adduct of a polyahl and an active ethylenically unsaturated isocyanate with (2) at least one other ethylenically unsaturated monomer; or
   (C) an adduct of (1) a polyahl and (2) an addition copolymer of an active ethylenically unsaturated isocyanate with at least one other ethylenically unsaturated monomer which is nonreactive with the isocyanate; or
   (D) a mixture of (B) and (C); or
   (E) a mixture of (B) and/or (C) and a polymer of at least one other ethylenically unsaturated monomer.

2. A method for making the copolymer dispersion of claim 1 which method comprises:
   (A) reacting an active ethylenically unsaturated isocyanate with a polyahl to form an adduct and
   (B) copolymerizing the adduct with another ethylenically unsaturated monomer or a mixture of at least two of such other monomers in a polyahl liquid medium which medium is a continuous phase.

3. A method for making the copolymer dispersion of claim 1 which method comprises:
   (A) copolymerizing an active ethylenically unsaturated isocyanate with another ethylenically unsaturated monomer or a mixture of at least two of such other monomers and
   (B) reacting the resulting copolymer with a polyahl in excess polyahl to form an adduct of polyahl and copolymer dispersed in polyahl.

4. A polyurethane composition which is the reaction product of the copolymer dispersion of claim 1 and an organic polyisocyanate.

5. A polyurethane composition of claim 4 in the form of a foam.

6. The dispersion of claim 1 wherein the polyahl is a polyether polyol, the ethylenically unsaturated isocyanate is an isocyanate alkyl ester of an α,β-ethylenically unsaturated carboxylic acid, and the other ethylenically unsaturated monomer or a mixture of at least two of such other monomers is a monovinylidene aromatic, an ethylenically unsaturated nitrile, an alkyl ester of α,β-ethylenically unsaturated carboxylic acid, a vinyl halide, a vinylidene halide or a mixture of two or more thereof.

7. The dispersion of claim 6 wherein the polyahl is a polyalkylene polyether polyol, the isocyanate is 2-isocyanatoethyl methacrylate and the other monomer is styrene, acrylonitrile or a mixture thereof.

8. The dispersion of claim 1 or 6 wherein the other monomer or mixture of such other monomers constitutes from about 1 to about 70 weight percent of the dispersion and the adduct constitutes from about 0.0002 to about 30 weight percent of the dispersion.

9. The dispersion of claim 1, 6 or 7 wherein the other monomer or mixture of such monomers constitutes from about 10 to about 40 weight percent of the dispersion and the adduct constitutes from about 0.02 to about 5 weight percent of the dispersion.

* * * * *